(12) United States Patent
Jalaguier

(10) Patent No.: US 7,559,743 B2
(45) Date of Patent: Jul. 14, 2009

(54) PROTECTION SYSTEM, A BELLOWS HINGE, AND AN AIRCRAFT

(75) Inventor: Jean-Pierre Jalaguier, Vitrolles (FR)

(73) Assignee: Eurocopter, Marignane (FR)

( * ) Notice: Subject to any disclaimer, the term of this patent is extended or adjusted under 35 U.S.C. 154(b) by 402 days.

(21) Appl. No.: 11/450,275

(22) Filed: Jun. 12, 2006

(65) Prior Publication Data

US 2006/0285976 A1 Dec. 21, 2006

(30) Foreign Application Priority Data

Jun. 13, 2005 (FR) .................................. 05 05960

(51) Int. Cl.
*B64C 27/37* (2006.01)
(52) U.S. Cl. ..................... 416/134 A; 277/635; 277/636
(58) Field of Classification Search ................. 415/155; 416/134 A; 277/634–636
See application file for complete search history.

(56) References Cited

U.S. PATENT DOCUMENTS 3,794,392 A * 2/1974 Scott .......................... 384/135
4,276,786 A * 7/1981 Langenstein ................. 74/491
5,203,522 A * 4/1993 White et al. .............. 244/17.11
6,171,010 B1 * 1/2001 Nagashima et al. ........... 403/51
6,644,671 B1 11/2003 Maughan et al.

FOREIGN PATENT DOCUMENTS

| DE | 1137735 | 12/1968 |
|---|---|---|
| EP | 0754623 | 1/1997 |
| FR | 2510211 | 1/1983 |
| FR | 2770828 | 5/1999 |
| FR | 2848524 | 6/2004 |
| WO | 81/01621 | 6/1981 |
| WO | 2004/088157 | 10/2004 |

OTHER PUBLICATIONS

International Search Report, Jan. 17, 2006.

* cited by examiner

*Primary Examiner*—Edward Look
*Assistant Examiner*—Nathaniel Wiehe
(74) *Attorney, Agent, or Firm*—Young & Thompson

(57) ABSTRACT

In order to protect a hinge, an elastomer confinement structure is provided presenting:
  upstream and downstream openings;
  a static cap;
  an upstream collar; and
  a hinge bellows.

Each opening has a ring for rigidly anchoring to a downstream member of the hinge, and each opening has a ring acting as a rigid receiver. The collar is movable and releasably secured by resilient fastening inspection means.

18 Claims, 2 Drawing Sheets

PROTECTION SYSTEM, A BELLOWS HINGE, AND AN AIRCRAFT

The invention relates in general to providing a hinge for transmitting movement and/or forces with protection against aggressive atmospheres.

BACKGROUND OF THE INVENTION

The term "hinge for transmitting movement and/or forces" is used to mean a functional assembly suitable firstly for providing a certain amount of freedom between an upstream member and a downstream member, and secondly for transmitting either movements or forces between said two members.

In such a functional assembly, at least one upstream member such as a link is provided with a male core (e.g. spherical or cylindrical) that is received in such a manner as to be guided with small functional clearance in a concave or female bearing of a downstream member such as a clevis axis, the bearing being complementary to the core. Or vice versa if the core is downstream and the bearing upstream.

For example it can be constituted by a ball joint, a cylindrical bearing, or the like.

The concepts of movements and forces relate respectively to transmissions providing displacements of dynamic order, and those that provide zero or negligible displacements and that should be considered as being substantially static.

Depending on the type of hinge to be protected, one or more movements between the male member and the female member are possible, such as rotations (roll, pitch or yaw, for example).

The term "aggressive atmosphere" is used to mean an operating or storage environment for the hinge that is capable of spoiling or degrading the hinge, or even destroying it.

For example, an aggressive atmosphere may contain abrasive particles such as dust or sand, corrosive agents such as sea salt, or pollutants (solvent vapors, etc.), or indeed it may present physico-chemical properties that are harmful, in particular in terms of humidity, temperature (hot or cold), or radiation.

To simplify, the invention is described in the context of a spherical ball joint for the hub of the main drive rotor of a helicopter, which presents a problem of protection against abrasive atmospheres under certain conditions of use of the helicopter.

This is explained by the field from which the invention stems, however the invention is not limited in any way to this field in terms of the scope of its general aspects.

On the contrary, the invention is applicable to any other field in which it is useful to be able to protect a hinge against one or more types of aggressive atmosphere.

That said, the description returns to the above-mentioned practical example of providing protection to a hinge in the main drive rotor of a helicopter against aggressive particles that might damage it.

Under certain conditions of use, helicopters are highly exposed to aggressive atmospheres, such as dust or sand.

Certain ball joints on board such aircraft, in particular those of blade control links or of a frequency adapter (or drag damper) are thus subjected to degraded performance because of such sand or dust.

This can even be dangerous for the aircraft and for people on board and/or nearby.

It is therefore useful to protect such ball joints, which are considered as being vital components of the aircraft.

Faced with such a situation, it would appear, logical to make use of an elastomer bellows system.

Nevertheless, numerous ball joints on board helicopters are not suitable in practice for being protected merely by being covered using a bellows, in particular because of the following:

large amplitudes and high frequencies in the operation of the hinge, leading to risks of the protection breaking or suffering other damage;

high dynamic stresses applied to said hinges, leading to risks of the protection becoming separated in untimely manner from its target ball joint;

movements and forces of large magnitudes within such hinges, leading to deformations that do damage to the usual means for sealing conventional bellows;

the requirement for easy, fast, and inexpensive replacement of a protection system that has become worn, or damaged, or whenever such a replacement is required in a maintenance procedure; and draconian standards and safety requirements which require the state of a hinge to be inspected visually on a regular basis, and thus require the protection system to be opened.

None of the documents mentioned below describes nor suggests a solution that is acceptable in practice given the above problem.

Document FR 2 510 211 describes a hermetically sealed spherical cap gasket for a steering coupling bar of a self-propelled land vehicle. That gasket is enclosed between two compression rings. One of the rings has a bellows filled with lubricant.

A support is interposed between the rings, and is held together with them, by a metal shell, itself provided with a cap-forming dome opposite from a passage for a tail of the spherical cap.

Document FR 2 770 828 describes a pitch control device for the blades of the main rotor of a rotorcraft, the device being of the type in which each blade is firstly driven in rotation about a shaft of the rotor, and is secondly constrained in rotation with a pitch lever about a pitch-change axis of the blade, each of which levers is controlled by a pitch link.

A plate that turns with the rotor is connected to each of the pitch links by a respective ball joint at the bottom end of the pitch control link.

Document FR 2 848 524 describes a device having swashplates for controlling the pitch of the blades in a helicopter rotor. On one type of rotor that is shown, each pitch control lever is arranged to project from the leading edge of the corresponding blade via a ball joint on a sleeve connecting said blade to the hub.

A moving swashplate is also mounted on the mast and receives the ends of the pitch control levers that are remote from the blades, likewise via ball joints. The mast also receives a stationary plate secured to a structure of the helicopter via a scissors linkage whose end for connection to the stationary plate is also provided with a ball joint.

Other ball joint hinges connect the stationary plate to links for servo-controlling cyclical or collective pitch.

Document EP 0 754 623 describes an electrical connection installation between an electrical power supply conductor and a device for defrosting a rotor blade. Those blades are mounted on a hub constrained to rotate with a rotor mast and they are connected together in pairs to the hub via drag dampers. Such an interblade damper has a ball joint at each of its ends.

Document U.S. Pat. No. 6,644,671 describes a ball joint cap capable of large angle articulation for water crafts that are exposed to high levels of moisture. The cap possesses two openings in alignment, one of which includes an internal collar for attaching to the cage of the ball joint. Between the collar opening and a rod-passing opening, there is provided a bellows having special folds that can accommodate large angles.

Document WO 81/01621 describes a sealing element for a transverse fastener ball joint for a steering or transmission mechanism in a worksite land vehicle.

The elastomer element surrounds the ball joint and includes a cap. The cap possesses two transverse openings, each having a shoulder that is received in a hoop groove. Longitudinally, the cap and the element include a cylindrical closed portion.

Remote from the cylindrical portion, the cap presents a bellows from which there extends a shaft of the ball joint. The elastomer element is filled with grease.

Document WO 2004/088157 describes a sealed spherical bearing with a pair of rubber bellows rings mounted on either side of a bearing body for passing two opposite rods that are in alignment.

Each rod is integrated with a hinge ball, and close to said ball possesses a groove in which one of the bellows is assembled.

OBJECTS AND SUMMARY OF THE INVENTION

In order to satisfy these problems, the invention provides one or more solutions making it possible:

to obtain an elastomer protection structure suitable for withstanding large amplitudes and high operating frequencies of the ball joint;

to provide said structure with a hinge bellows that is held between two "static" portions, i.e. a cap for confining the ball (secured to a shoulder of the ball, on passing through a transmission whole), and anchoring to the actuator rod, suitable for following displacements of large amplitude when the ball joint is in operation;

to reinforce the mounting of the elastomer protection structure (via the ball having a shoulder and a rigid anchor ring secured on the actuator shaft) so as to avoid any risk of untimely separation of the protection; and to allow resilient fastening (sometimes referred to as snap-fastening) of the protection on the rigid anchor ring secured to the actuator rod, below the bellows, in order to allow visual inspections to check the state of the ball joint.

The invention seeks in particular to solve the above-mentioned problems and to implement certain prescribed solutions.

To this end, in one aspect the invention provides a protection system for providing a hinge for transmitting movement and/or forces with protection against aggressive atmospheres; the target hinge comprising at least:

an upstream member generally extending along a longitudinal direction;

a downstream member generally extending along an intersecting direction, forming a non-zero offset angle relative to the longitudinal direction; and the upstream and downstream members respectively including a male coupling core and a female coupling bearing, or vice versa; the female bearing being concave and complementary to the male core so that the coupling core is movably received in the bearing so as to allow relative rotation to take place between the upstream member and the downstream member.

According to the invention, the protection system comprises an elastomer confinement structure having at least:

two through openings, respectively an upstream opening and a downstream opening for the upstream member and for the downstream member, the upstream and downstream openings extending substantially in respective pierced surfaces, that when the system is in the rest position, are perpendicular respectively to the longitudinal direction and to the intersecting direction;

a static cap of the confinement structure made of an elastomer material and designed substantially to enclose at least the male core and the female bearing; the static cap defining at least one downstream opening for passing the downstream member out from the structure;

an elastomer-material upstream collar of the structure for locally surrounding the upstream member; said collar being movable and defining at least the upstream opening for passing the downstream member out from the structure; and at least one hinge bellows of elastomer material held between the static cap and the movable upstream collar of the structure.

Each through downstream opening has a rigid downstream anchor ring secured rigidly in said downstream opening and also designed to be statically secured to the downstream member; while each upstream through opening includes an upstream ring acting as a rigid receiver on which firstly the movable collar of the structure is secured in releasable manner; the upstream ring secondly being designed to be rigidly secured to the upstream member.

The confinement structure possesses resiliently fastenable inspection means between the upstream ring and the movable collar serving to secure the confinement structure to the ring in releasable manner when the protection system is in an operating state.

In an embodiment, the confinement structure comprises the static cap, the upstream collar, the hinge bellows, and the resiliently fastenable inspection means forming a single piece of elastomer.

For example, said single piece is made at least locally out of reinforced elastomer.

In an embodiment, the downstream ring and the upstream ring include means for fastening them in sealed manner respectively on the downstream member and on the upstream member, with the inspection means also being sealed.

For example, the sealed fastener and inspection means are hermetic against an aggressive atmosphere at least, the atmosphere being of the type having: abrasive particles and/or corrosion agents and/or pollutants and/or harmful physico-chemical properties.

In an embodiment, the confinement structure has three through openings, comprising one upstream opening and two downstream openings, the two downstream openings extending substantially in respective pierced planes that are substantially parallel to each other and perpendicular to the upstream pierced plane when the system is in a rest position.

In an embodiment, the static cap presents a generally toroidal shape with the intersecting direction defining a development axis for the toroidal shape of the cap.

For example, the cap has two downstream openings each defining an internal limit for centered transverse cavities.

In an embodiment, the upstream collar and the downstream ring are for mounting on their respective members in rigid manner that is sealed but can be taken apart in a workshop.

In an embodiment, the hinge bellows has at least two series of peripheral indentations.

For example, a peripheral indentation in the middle of the static cap forming an inspection folding zone, about which a portion of the bellows and the collar can be moved through an inspection offset by being moved away from the upstream hinge member.

In an embodiment, the inspection means form a peripheral groove for anchoring the upstream ring.

For example, this groove of the inspection means presents a U-shape in a plane defined by the longitudinal and transverse directions that is complementary to the outside shape of the upstream ring and that opens out facing the upstream hinge member.

In another aspect, the invention provides a hinge having a protection system of the invention as mentioned above mounted thereon.

According to the invention, in the rest position, the intersecting direction of the downstream hinge member defines, relative to the longitudinal direction of the upstream member, an offset angle that is greater than 45°.

For example, the offset angle lies in the range 45° to 180°, and is in particular about 90°.

In an embodiment, the male core and the female bearing define a cylindrical or spherical destination hinge for allowing relative movements in particular in rotation, e.g. in roll about a longitudinal direction and/or in pitch about a transverse direction and/or in yaw about an elevation direction.

In an embodiment, the upstream member is a link, with the male core received in guided manner with small functional clearance in the female or concave bearing of the downstream member which is formed by a clevis axis.

In an embodiment, the hinge is for fitting on board an aircraft, in particular a rotary wing aircraft such as a helicopter.

For example, the hinge forms part of a pitch control or of a frequency adapter, or indeed of an interblade damper for a helicopter rotor.

In an embodiment, the hinge is self-lubricating.

In another aspect, the invention provides an aircraft, of the type suitable for making use of the protection system and/or the hinge as specified above.

According to the invention, the aircraft is of the rotary wing type, such as a helicopter.

BRIEF DESCRIPTION OF THE DRAWINGS

The invention is described below with reference to embodiments given in non-limiting manner and shown in the accompanying drawings, in which.

MORE DETAILED DESCRIPTION

Figure 1:
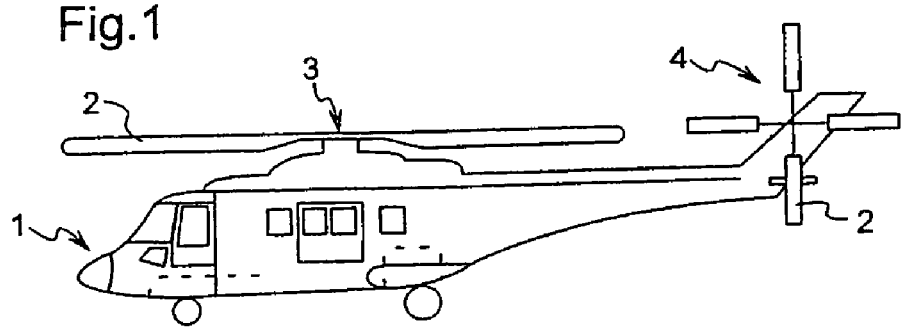
FIG. 1 is a diagrammatic longitudinal elevation view of a rotary wing aircraft in accordance with the invention, and specifically a helicopter, shown in side view with its front end or "nose" on the left and its rear end or "tail" on the right.

Embodiments of the invention are described below.

In the drawings, where similar components are designated by the same reference numerals, there can be seen three intersecting directions. In these examples, the three directions are mutually orthogonal, but the scope of the invention should not be limited to such configurations.

A direction Z referred to as the "elevation" direction corresponds to the height and the thickness of the structures in their description positions: the term up/down or top/bottom refers thereto.

Another direction X is said to be "longitudinal", corresponding to the length or main dimension of structures in their description positions. The terms front and rear relate thereto.

Yet another direction Y is said to be "intersecting". In the examples shown, it extends transversely across the longitudinal direction X and corresponds to the width or to lateral dimensions of the structures described. The term "side" refers thereto.

In FIG. 1, overall reference 1 designates a rotary wing aircraft. Specifically, the aircraft 1 is a helicopter.

Conventionally, the aircraft 1 has blades 2 mounted within a main rotor 3 for providing a drive and lift function.

The aircraft 1 of FIG. 1 also possesses, a so-called tail rotor 4 for opposing torque, which is connected like the rotor 3 to a main gearbox (MGB) that is not shown and that is driven in normal operation by a power plant, e.g. using one or more gas turbine engines.

Figure 2:
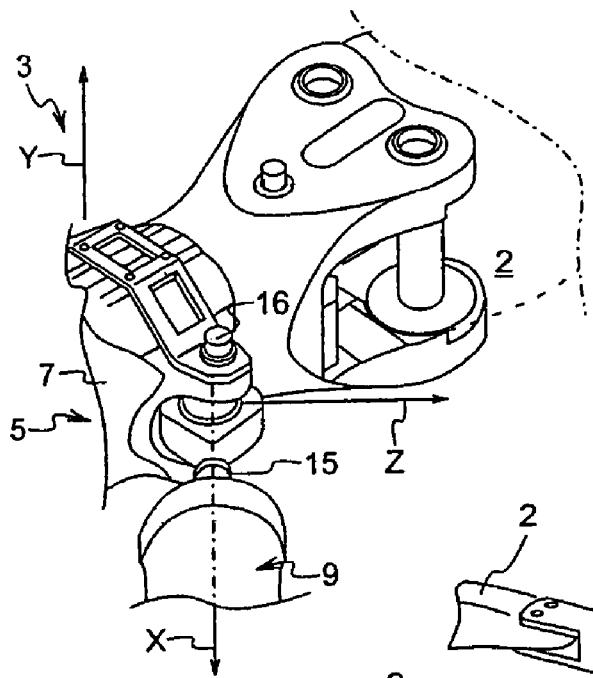
FIG. 2 is a simplified diagrammatic transverse perspective view as seen from above showing a detail of a helicopter rotor whose blades are connected in pairs to the rotor hub via an "interblade" drag damper having at each of its ends a hinge suitable for being protected by a system of the invention.
Figure 3:
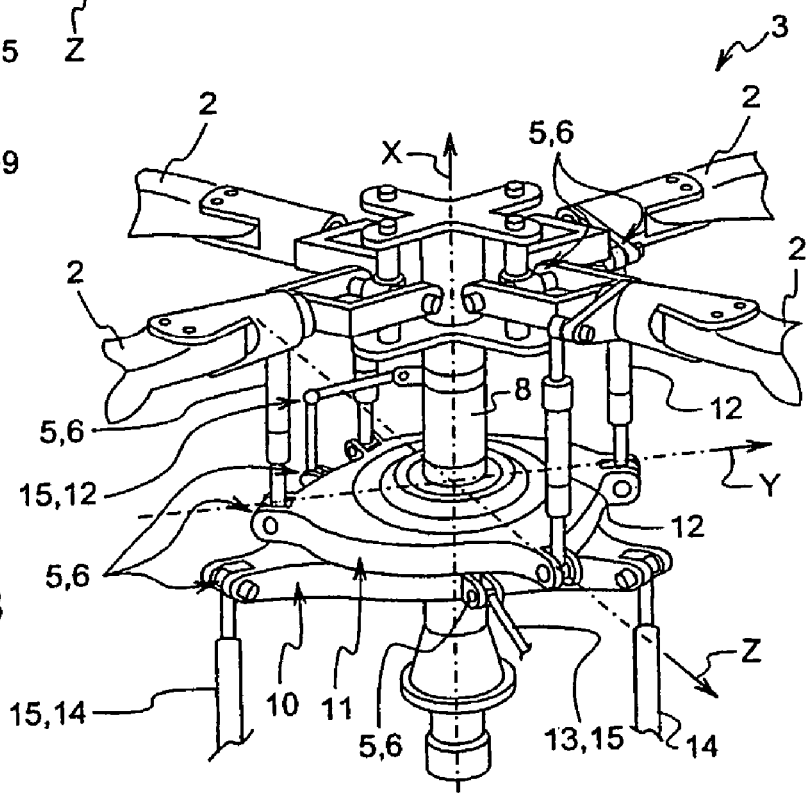
FIG. 3 is another simplified diagrammatic transverse perspective view as seen from above showing a detail of a helicopter rotor with pitch controls, fixed plate scissors linkages, and servo-controls provided with hinges suitable for being protected by a system of the invention.
Figure 4:
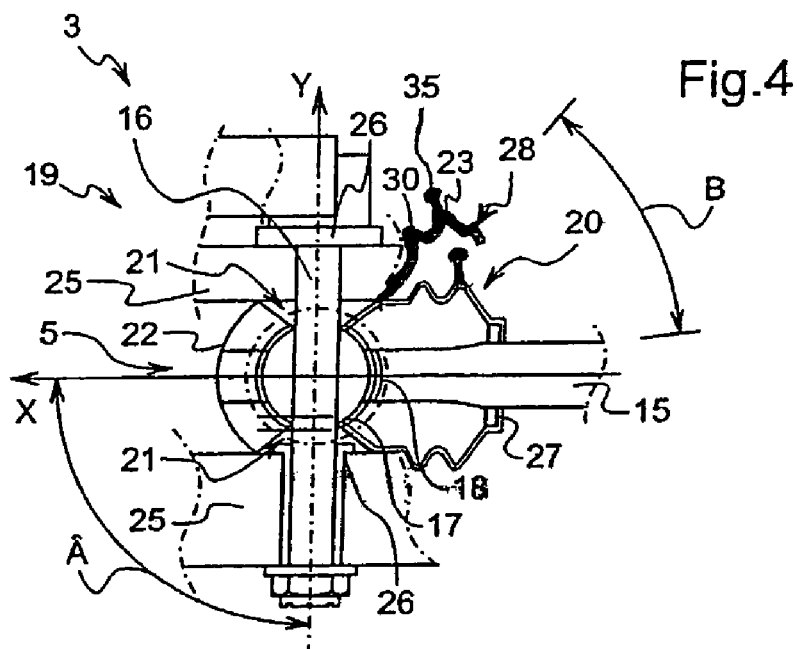
FIG. 4 is a fragmentary longitudinal and transverse view in section showing a hinge confined in a protection system of the invention shown firstly (at the bottom) in a normal operation position, and shown secondly (top right) in an inspection position in which a bellows together with an upstream collar are locally moved some distance away from an upstream hinge member; this figure also shows a crank take-off of the hinge.
Figure 5:
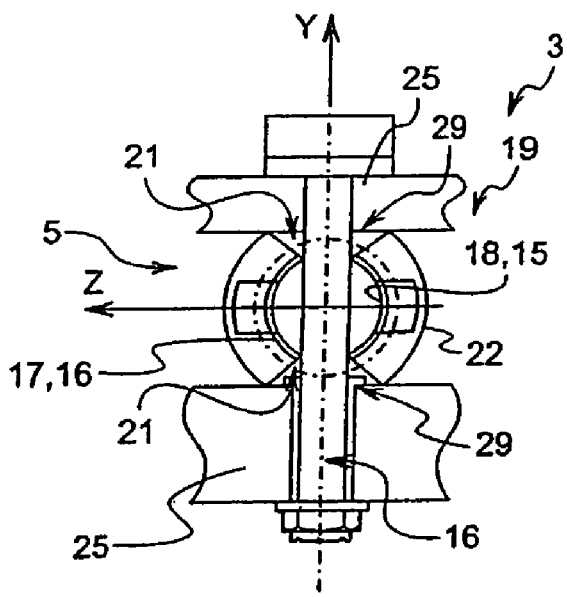
FIG. 5 is a fragmentary transverse and elevation view in section showing the hinge and the protection system of the invention that are visible in FIG. 4.
Figure 6:
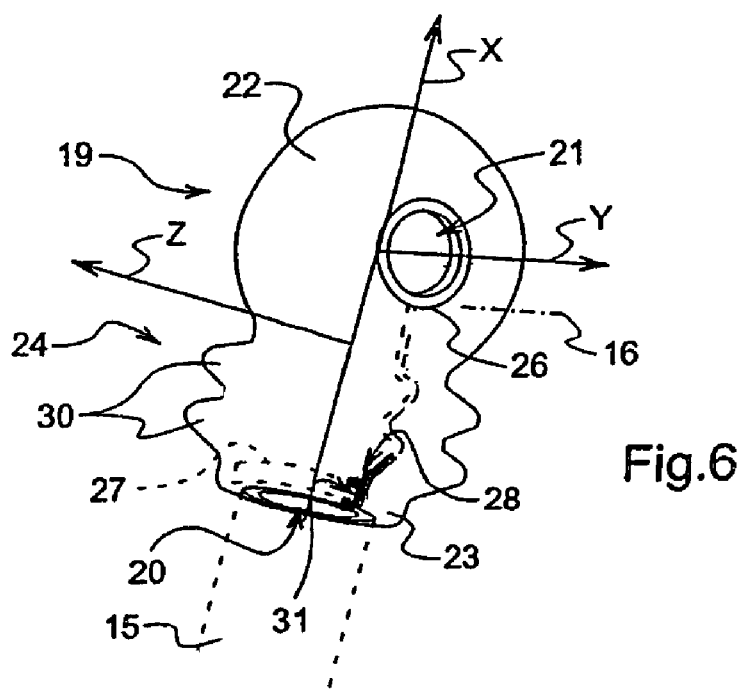
FIG. 6 is another simplified diagrammatic transverse perspective view as seen from above showing a detail of a confinement structure of a protection system of the invention comprising a static cap, an upstream collar, a downstream bellows, and resiliently fastened inspection means made as a one-piece part of reinforced elastomer.

In FIGS. 2 and 3, the rotors 3 include a plurality of hinges 5 that are suitable for being enclosed in a protection system 6 of the invention, e.g. as shown in FIGS. 4 to 6.

It can be seen that in the embodiments of the invention shown such hinges 5 for protection by a system 6 of the invention form also part of a tail rotor 4.

However other functional assemblies of an aircraft 1 are fitted with hinges 5 protected by means of the invention. The same applies to hinges 5 involved in completely different technical fields, such as those in land, air, or sea vehicles in particular.

Returning to FIGS. 2 and 3, it can be seen that the blades 2 are mounted in particular on a hub 7 of the rotor 3, said hub 7 being constrained to rotate with a rotor mast 8 (about an axis that is substantially parallel to the intersecting direction Y in FIG. 2 and to the longitudinal axis X in FIG. 3). It is this mast 8 that is connected to the gearbox (MGB) of the aircraft 1.

In FIG. 2, it can be seen that the blades 2 are connected together in pairs via a drag dampers 9. Each "interblade" damper 9 has a hinge 5 in the form of a ball joint at each of its ends.

In FIG. 3, there can be seen a rotor 3 of the type having plates 10 and 11 for controlling the pitch of the blades 2. The plates 10 and 11 are said to be "cyclic" or "swashplates".

The lower plate 10 in the longitudinal direction X is stationary, while the upper plate 11 in the longitudinal direction X is free to move.

The moving plate 11 is mounted on the mast 8 and receives pitch control levers 12 at their ends that are remote from the blades 2, via hinges 5 in the form of ball joints.

The mast 8 also receives a stationary plate 10 that is secured to a structure (not shown) of the aircraft 1, via a scissors linkage 13 whose end for connection to the plate 10 is visible and is likewise provided with a hinge 5 comprising a ball joint.

Other hinges 5 connect the stationary plate 10 to links 14 for servo-controlling the cyclic or collective pitch.

With such specific applications described, there follows a more general description of hinges 5 suitable for being protected by means of systems 6 of the invention.

To summarize, a hinge 5 comprises at least:
  an upstream member 15, generally extending along the longitudinal direction X (in the form of a lever 12, a rod of the damper 9, or of the link 14, in FIGS. 2 and 3); and
  a downstream member 16 generally extending along an intersecting direction (represented by the transverse direction Y), this direction Y forming a non-zero offset angle Â relative to the longitudinal direction X (FIG. 4).

In the examples of FIGS. 4 and 5, it can be seen that the (downstream) member 16 and the (upstream) member 15 comprise respectively:
  a male coupling core 17, rigidly (but releasably) secured to the downstream member 16; and
  a female bearing 18, for coupling therewith.

The bearing 18 is concave and rigidly secured to the upstream member 15. The bearing 18 is also complementary to the core 17, such that the core 17 is movably received in the bearing 18.

This allows coupling to take place while also permitting three relative rotations between the members 15 and 16.

In other embodiments that are not shown, the configuration is inverse, in the sense that the core 17 is upstream and the bearing 18 is downstream.

In general and as we have said it, in the embodiments, it is assumed that the upstream member 15 extends generally along the longitudinal direction X while the downstream member 16 extends generally along the intersecting direction represented by Y.

In the rest position, as shown in FIGS. 4 to 6, the intersecting direction Y of the member 16 defines an offset angle relative to the longitudinal direction X of the member 15 that is greater than 45°, and that can clearly be seen to be about 90°.

In other examples, the offset angle Â lies in the range 45° to 180°, but is not equal to 90.

In FIG. 3, the core 17 and the bearing 18 define a cylindrical or spherical hinge joint 5 that allows relative rotation between the scissors linkage 13 and the stationary plate 10.

In FIGS. 4 and 5, the hinge allows rotation about a plurality (three) axes, specifically roll, pitch, and yaw, for example.

In the same figures, the member 15 is a link, whose female bearing 18 is received in guided manner with small functional clearance in the concave core 17 of the member 16 formed by the axis of a clevis 25 on board the aircraft 1 to form part of a pitch control mechanism, or of a frequency adapter, or indeed of an interblade damper 9 of the rotor 3.

In this embodiment, the hinge 5 is self-lubricating.

With the hinge 5 sufficiently described, there follows a description in detail of the system 6 of the invention serving to protect it.

The system 6 comprises an elastomer confinement structure 19 which can be seen clearly in FIG. 6 in particular.

In general, such a structure 19 possesses at least:
  through openings 20 and 21;
  a static cap 22;
  an upstream collar 23; and
  a hinge bellows 24.

The structure of the openings 20 and 21 is described below with reference to FIGS. 4 to 6.

An upstream opening 20 (at the bottom of FIG. 6) is arranged to pass the member 15, while the hinge (the core 17 and the bearing 18) is protected by being confined inside the cap 22.

It can clearly be seen from FIGS. 4 and 5 that the structure 19 is provided with two downstream openings 21 since they enable two opposite ends of the downstream member 16 to pass out from the cap 22 along the direction Y.

Each of these downstream openings 21 extends substantially in a pierced surface that is perpendicular to the intersecting direction Y (of the member 16) when the system 6 is in the rest position.

There is only one upstream opening 20, extending substantially in a pierced surface that is different from that of the openings 21, and in particular that is perpendicular to the longitudinal direction X (of the member 15) when the system 6 is in the rest position.

The confinement cap 22 is made of elastomer material and is designed mainly to substantially enclose the core 17 and the bearing 18.

It is the static cap 22 that defines the through openings 21 for passing the downstream member out from the structure 19. However it is the collar 23 that defines the opening 20 for passing the downstream member out from the same structure 19.

The collar 23 surrounds the member 15 locally. It can clearly be seen in FIG. 4 that the collar 23 can be moved (see inspection offset B) in order to inspect the hinge 5 (e.g. visually).

The collar 23 is made of elastomer material, as is the bellows 24, which is located between the cap 22 and the collar 23.

The confinement structure 19 constitutes a single piece of elastomer comprising the cap 22, the collar 23, and the bellows 24. In the example of FIG. 6, this structure 19 is reinforced, at least locally.

The term "reinforced" is used herein to mean that the structure 19 has a relatively rigid zone for taking up operating forces.

Depending on the application, this is achieved with the help of the following in particular:
  extra thickness; and/or
  material that is more rigid (harder); and/or
  an insert such as a ring or fibers (of carbon, metal, etc. . . . ).

Outside the structure 19, the protection system 6 provides for each downstream opening 21 to be fitted with a downstream ring 26.

In FIGS. 4 to 6, the two rings 26 that provide rigid anchoring are each secured rigidly in the corresponding through opening 21 for passing the member 16. Each ring 26 is also statically secured to the downstream member 16.

In FIG. 6, the rings 26 are inserts integrated in the cap 22 of the structure 19, e.g. while it is being molded.

Similarly, the (upstream) opening 20 has an upstream ring 27 (FIG. 4) acting as a rigid receiver.

The movable collar 23 of the structure 19 is secured releasably to the ring 27. The ring 27 is rigidly secured to the upstream member 15.

It can be understood that the rings 26 and 27 both because of their rigidity which provides them with good wear resistance and resistance to deformation, and because of their static connection to their respective receiver members 16-15, ensure that these members 16-15 do not become separated in untimely manner from the structure 19, and consequently prevent an aggressive atmosphere intruding as far as the hinge 5.

In addition, these rings 26 and 27 form a stable reference for long-lasting and reliable assembly of the structure 19 on the members 16 and 15.

This is a configuration in which the confinement structure 19 has three through openings 20-21, with one upstream opening 20 and two downstream openings 21, the two downstream openings 21 extending substantially in pierced planes that are substantially mutually parallel, and perpendicular, when the hinge 5 is in the rest position, to the upstream pierced plane of the opening 20 (as shown in FIG. 4 in particular).

Furthermore, it can be seen in FIGS. 4 and 6, that the confinement structure 19 possesses inspection means 28 between the ring 27 and the collar 23 (which means can be moved, as described above).

In the figures, it can clearly be understood that the means 28 are resiliently fastened, i.e. they are snap-fastening means.

The means 28 can serve to secure the structure 19 to the ring 27 in releasable manner, when the protection system 6 is in its normal operating state (bottom of FIG. 4).

These means 28 ensure that the structure 19 is secured to the ring 27 in releasable manner, making it possible to inspect the protection system 6 (top of FIG. 4).

The inspection means 28 are naturally designed so that the system 6 remains securely anchored on the hinge 5 while it is in operation. This is made easier by the fact that the connections between the system 6 and the hinge 5 tend to concentrate the operating forces on the more rigid zones 22 and 23 of the system 6, while the zones 24 dedicated to movement are relatively free therefrom. The zones dedicated to movement are relatively flexible compared with the zones 22 and 23 dedicated to anchoring purposes (e.g. by being reinforced).

In the inspection state, the bellows 24 is bent outwards, and the movable collar 23 is moved away from the member 15 by an inspection offset B. It can be seen that the rigid ring 27 remains in position on the upstream member 15, while an opening for inspection purposes is thus provided so as to give visual or other access to the hinge.

This makes it possible to inspect the state of the hinge 5, and also to perform maintenance operations such as cleaning.

Once these operations have been terminated, it is easy to reclose the structure 19 and to engage the inspection means 28 back on the ring 27, by resilient fastening.

In this embodiment in particular, the rings 26 and 27 cooperate with the means 28 to seal the connections respectively on the member 16 and on the member 15, and also to ensure that the inspection means 28 remain sealed.

This configuration for the system 6 reconciles constraints that would to be antagonistic.

The invention makes it possible both to provide an opening (offset B) for inspection purposes (i.e. to provide a certain amount of freedom between the structure 19 and the hinge 5) on occasion, while also avoiding any untimely loss of sealing, even during movements that are fast and dynamic and/or of large amplitude.

This is obtained by a kind of decoupling effect between the anchor zones (rigid ring 27, inspection means 28, displaceable collar 23 for the upstream side and ring 26 and cap 22 for the downstream side), and the zones (bellows 24) dedicated to dynamic flexing in operation, and also the zones for providing the inspection offset B.

In other words, the anchor zones of the system 6 are firmly secured to the members 15 and 16, while the central zone (bellows 24) dedicated to flexing is isolated and arranged to resist as little as possible any movements of the hinge 5.

In addition, this reduces the stresses internal to the confinement structure 19, and thus avoids as much as possible any tearing of the elastomer of the component.

In operation of particular applications for use of the hinge 5, the means 28 (sealed connection and inspection means) are designed to be hermetic against an aggressive atmosphere at least of one of the following types:

abrasive; and/or corrosive; and/or polluting; and/or harmful from a physico-chemical point of view.

Certain particular features shown in the drawings are described below briefly.

In FIGS. 4 to 6, the cap 22 is generally toroidal in shape, the intersecting direction Y defining a development axis for its toroidal shape. This optimizes the size of the structure 19 compared with that of the hinge 5 that it protects, by fitting around its outline as closely as possible.

It can also be seen in FIG. 5 that the two openings 21 in the cap 22 define respective internal limits for transverse cavities 29 centered on the middle axis of the member 16.

This enables the elements of the clevis 25 supporting the member 16 to be brought closer to the hinge 5. The rings 26 are contiguous with the core 17.

In an embodiment, the bellows 24 has at least two series of peripheral indentations. These indentations are spaced apart in the longitudinal direction X (in the normal position) by substantially annular projections 30.

In FIG. 4, one of these annular projections 30 includes a projecting finger 35 that forms a tongue for gripping manually to facilitate opening up for inspection (offset B).

In this example, it can readily be understood that the middle peripheral indentation of the cap 22 forms a preferred folding zone for inspection purposes, about which a portion of the bellows 24 and the collar 23 can be moved (offset B) for inspection purposes, by being moved away from the member 15.

In the embodiment of FIG. 6, the inspection means 28 form a peripheral groove 31 for anchoring the ring 27.

In a plane defined by the longitudinal direction X and the transverse (or intersecting) direction Y, the groove 31 presents a U-shape complementary to the outside shape of the ring 27, and opening out facing the member 15.

In an embodiment, the rings 27 and 26 are for mounting on the respective members 15 and 16 in a manner that is rigid and sealed, but that can be taken apart in a workshop.

What is claimed is:

1. A protection system for providing a hinge for rotary wing aircraft transmitting high dynamic and large magnitude movement and/or forces with protection against aggressive atmospheres; the target hinge comprising at least: an upstream member generally extending along a longitudinal direction; a downstream member generally extending along an intersecting direction, forming a nonzero offset angle relative to the longitudinal direction; and the upstream and downstream members respectively including a male coupling core and a female coupling bearing, or vice versa; the female bearing being concave and complementary to the male core so that the coupling core is movably received in the bearing so as to allow relative rotation to take place between the upstream member and the downstream member;

the protection system comprising an elastomer confinement structure having at least: two through openings, respectively an upstream opening and a downstream opening for the upstream member and for the downstream member, the upstream and downstream openings extending substantially in respective pierced surfaces that when the system is in the rest position, are perpendicular respectively to the longitudinal direction and to the intersecting direction; a static cap of the confinement structure made of an elastomer material and designed substantially to enclose at least the male core and the female bearing; the static cap defining at least one downstream opening for passing the downstream member out from the structure; an elastomer-material upstream collar of the structure for locally surrounding the upstream member; said collar being movable and defining at least the upstream opening for passing the downstream member out from the structure; at least one hinge bellows of elastomer material held between the static cap and the movable upstream collar of the structure; each through downstream opening having a rigid downstream anchor ring secured rigidly in said downstream opening and also designed to be statically secured to the downstream member; while each upstream through opening includes an upstream ring acting as a rigid receiver on which firstly the movable collar of the structure is secured in releasable manner, the upstream ring also being designed to be rigidly secured to the upstream member; the confinement structure possessing resiliently fastenable inspection means between the upstream ring and the movable collar serving to secure the confinement structure to the ring in releasable manner when the protection system is in an operating state; the confinement structure comprises the static cap, the upstream collar, the hinge bellows, and the resiliently fastenable inspection means forming a single piece of elastomer, said single piece of elastomer having a snap action between the upstream ring and the removable collar, thereby to be resiliently fastenable, and portions of the single piece of elastomer that have snap action is less flexible than the bellows.

2. A system according to claim 1, wherein the confinement structure is made at least locally out of reinforced elastomer.

3. A system according to claim 1, wherein the downstream ring and the upstream ring include means for fastening them in sealed manner respectively on the downstream member and on the upstream member, with the inspection means also being sealed; said sealed fastener and inspection means are hermetic against an aggressive atmosphere at least, the atmosphere being of the type having: abrasive particles and/or corrosion agents and/or pollutants and/or harmful physico-chemical properties.

4. A system according to claim 1, wherein the confinement structure has three through openings, comprising one upstream opening and two downstream openings, the two downstream openings extending substantially in respective pierced planes that are substantially parallel no each other and perpendicular to the upstream pierced plane when the system is in a rest position, the two downstream openings each defining in said cap an internal limit for centered transverse cavities.

5. A system according to claim 1, wherein the static cap presents a generally toroidal shape with the intersecting direction defining a development axis for the toroidal shape of the cap.

6. A system according to claim 1, wherein the upstream collar and the downstream ring are for mounting on their respective members in rigid manner that is sealed but can be taken apart in a workshop.

7. A system according to claim 1, wherein the hinge bellows has at least two series of peripheral indentations; said series of peripheral indentations comprising a peripheral indentation in the middle of the static cap forming an inspection folding zone, about which a portion of the bellows and the collar can be moved through an inspection offset by being moved away from the upstream hinge member.

8. A system according to claim 1, wherein the inspection means form a peripheral groove for anchoring the upstream ring; said peripheral groove of the inspection means presenting a U-shape in a plane defined by the longitudinal and transverse directions that is complementary to the outside shape of the upstream ring and that opens out facing the upstream hinge member.

9. A hinge having a protection system according to claim 1 mounted thereon, and wherein, in the rest position, the intersecting direction of the downstream hinge member defines, relative to the longitudinal direction of the upstream member, an offset angle that is greater than 45°.

10. A hinge according to claim 9, wherein the male core and the female beating define a cylindrical or spherical destination hinge for allowing relative movements in particular in rotation, including in roll about a longitudinal direction and/or in pitch about a transverse direction and/or in yaw about an elevation direction.

11. A hinge according to claim 9, wherein the upstream member is a link, with the male core received in guided manner with small functional clearance in the female or concave bearing of the downstream member which is formed by a clevis axis.

12. A hinge according to claim 9, wherein the hinge is for fitting on board the rotary wing aircraft, the hinge forming part of a pitch control, or part of a frequency adapter, or part of an inter-blade damper for the rotary wing aircraft.

13. A hinge according to claim 9, wherein the hinge is self-lubricating.

14. An aircraft, the aircraft being of the type suitable for using the protection system according to claim 1.

15. An aircraft, the aircraft being of the type suitable for using the hinge according to claim 9.

16. The hinge according to claim 9, wherein the offset angle lies in the range between 45° and 180°.

17. The hinge according to claim 16, wherein the offset angle is about 90°.

18. The hinge according to claim 12, wherein the rotary wing aircraft is a helicopter and the hinge Is on a rotor of the helicopter.

* * * * *